(12) United States Patent
Chaturvedi

(10) Patent No.: US 12,138,827 B2
(45) Date of Patent: Nov. 12, 2024

(54) CONVERTING NON-BIODEGRADABLE POLYMERIC GRANULES AND COMPONENTS TO BIODEGRADABLE BY SURFACE COATING

(71) Applicant: Ashok Chaturvedi, New Delhi (IN)

(72) Inventor: Ashok Chaturvedi, New Delhi (IN)

(*) Notice: Subject to any disclaimer, the term of this patent is extended or adjusted under 35 U.S.C. 154(b) by 429 days.

(21) Appl. No.: 17/436,878

(22) PCT Filed: Mar. 7, 2020

(86) PCT No.: PCT/IN2020/050214
§ 371 (c)(1),
(2) Date: Sep. 20, 2021

(87) PCT Pub. No.: WO2020/183490
PCT Pub. Date: Sep. 17, 2020

(65) Prior Publication Data
US 2022/0161458 A1 May 26, 2022

(30) Foreign Application Priority Data
Mar. 9, 2019 (IN) .............................. 201911009252

(51) Int. Cl.
| C08J 3/22 | (2006.01) |
| B29B 9/06 | (2006.01) |
| B29B 9/12 | (2006.01) |
| B29B 9/16 | (2006.01) |
| C08J 3/20 | (2006.01) |

(52) U.S. Cl.
CPC ............... B29B 9/12 (2013.01); B29B 9/065 (2013.01); B29B 9/16 (2013.01); *B29B 2009/163* (2013.01); *B29B 2009/168* (2013.01)

(58) Field of Classification Search
CPC ..................................... C08J 3/226; C08J 3/20
See application file for complete search history.

(56) References Cited

U.S. PATENT DOCUMENTS

| 6,258,924 B1 * | 7/2001 | Warzelhan ......... C08G 18/4286 |
| | | 528/307 |
| 9,925,707 B2 * | 3/2018 | Iyer ....................... B29C 48/022 |
| 2008/0008647 A1 * | 1/2008 | Richard ..................... C08J 3/12 |
| | | 424/490 |
| 2008/0103232 A1 | 5/2008 | Lake et al. |
| 2009/0311337 A1 * | 12/2009 | Tanahashi ................. A61P 7/04 |
| | | 514/772.3 |
| 2010/0255326 A1 * | 10/2010 | Chiappini ............... B32B 27/26 |
| | | 427/535 |
| 2011/0177231 A1 * | 7/2011 | Grinberg ............... A61K 9/1641 |
| | | 427/2.14 |
| 2012/0135169 A1 * | 5/2012 | Tangelder ............... B29B 7/007 |
| | | 428/35.2 |
| 2020/0199354 A1 * | 6/2020 | Dalibey ............... C08K 5/0033 |

FOREIGN PATENT DOCUMENTS

| EP | 3162841 A1 | 5/2017 |
| JP | 06322263 A * | 11/1994 |
| JP | H06322263 A | 11/1994 |
| WO | 2014079844 A1 | 5/2014 |
| WO | 2016008746 A1 | 1/2016 |
| WO | 2020183490 A2 | 9/2020 |

OTHER PUBLICATIONS

International Search Report and Written Opinion dated Sep. 15, 2020, pertaining to Int'l Patent Application No. PCT/IN2020/050214.

* cited by examiner

*Primary Examiner* — Cachet I Proctor
(74) *Attorney, Agent, or Firm* — Dinsmore & Shohl LLP

(57) ABSTRACT

The present invention describes a process to convert non-biodegradable polymeric raw materials or pellets/granules into biodegradable raw materials/pellets/granules by applying enzyme-based coating, in water or suitable solvent or combination thereof, on their surfaces, before construction of the components from them.

3 Claims, No Drawings

CONVERTING NON-BIODEGRADABLE POLYMERIC GRANULES AND COMPONENTS TO BIODEGRADABLE BY SURFACE COATING

FIELD OF THE INVENTION

The present invention relates to biodegradability of polymers by applying enzyme-based coating on the surface of any polymer, polymer blend or composite granules and polymeric components manufactured therefrom. More particularly invention relates to non-biodegradable polymeric material granules and injection moulded, extruded or formed by any other manufacturing method, surface coated with an enzyme based composition in water or suitable solvent or combination thereof, to make them biodegradable and a method of applying a thin layer of the enzyme based coating on complete or partial surface of the non-biodegradable polymeric material granules and injection moulded, extruded or formed by any other manufacturing method, to induce biodegradability in the granules and/or components. The coated components are various polymeric components such as PET preforms, bottles, furniture, rigid packaging including trays, and boxes, sheets or other articles made thereof.

BACKGROUND

Plastics are typically organic polymers of high molecular mass. They are usually synthetic and made by polymerisation, most commonly derived from petrochemicals. Plastics are inexpensive, durable and easy to process substances compared to the other options, which are employed to manufacture a variety of components that find usage in a wide range of applications. As a consequence, the production of plastics has increased dramatically over the last few decades. Because of the durability of the polymeric products having high resistance to degradation (due to high molecular mass values, hydrophobicity and crystallinity), despite being recyclable, due to poor collection, substantial quantities of disposable plastics are piling up in landfill sites and in natural habitats, generating increasing environmental problems worldwide.

To answer these problems, different physical, chemical and/or biochemical approaches have been developed to reduce the biodegradation resistance of polymeric products and to increase their biodegradation rate. For example, enzyme-based additives have been introduced which are mixed/blended with polymeric resin during polymer manufacturing stages or with the polymeric granules during component manufacturing processes to make polymeric component biodegradable.

The enzyme based additive mixed with polymeric resin is not utilized fully and a small portion of the total additive mixed, which is present only on the surface of the final component, attract the microbes and depletes the surface and reduces the component thickness layer by layer. Hence most of the additive blended during manufacturing remains within the thickness of the component and is not utilized. The cost of dosing the additive by this method increases the cost of making biodegradable polymers as most of the additive blended during manufacturing reside inside the surface of the component and thus go waste.

The enzyme based additives are sensitive to high temperatures particularly in multiple heating and cooling cycles which tend to make the transparent or light coloured components hazy and brownish.

Thus due to high cost of the additive consumed in making biodegradable Polymeric component and its limitation to convert pre-manufactured Polymeric component to biodegradable component, there is a need of improved process to make/convert non-biodegradable polymers or polymeric components to biodegradable at a fraction of cost that of the prior art, at minimum temperatures and with minimum heat cycles, saving energy cost as well. Also there is a need of a process to make biodegradable rigid/moulded polymeric components by converting non-biodegradable polymeric raw materials or pellets/granules into biodegradable raw materials/pellets/granules before construction of the components from them.

SUMMARY OF THE INVENTION

The present invention describes a process to convert non-biodegradable polymeric raw materials or pellets/granules into biodegradable raw materials/pellets/granules by applying enzyme-based coating, in water or suitable solvent or combination thereof, on their surfaces, before construction of the components from them.

The present invention also describes bio-degradable polymeric components made from non-biodegradable polymeric materials having enzyme-based coating on their surfaces and a method of coating the enzyme-based composition on the surface(s) of polymeric components to convert them into biodegradable. The enzyme-based composition in water or suitable solvent or combination thereof is applied on the surface of the polymeric components during or after manufacturing them by injection moulding, blow moulding, extrusion, casting or any other manufacturing process.

DETAILED DESCRIPTION OF THE PRESENTLY PREFERRED EMBODIMENTS

While the present invention has been described in connection with what are currently considered to be the most practical and preferred embodiments, it is to be understood that various arrangements and alternative embodiments are intended to be included within the scope of the appended claims.

The present invention relates to biodegradability of polymers by applying enzyme-based coating on partial or complete surface of any polymer, polymer blend or composite granules and polymeric components manufactured therefrom.

The enzyme present in the enzyme-based composition are natural protein molecules that act as highly efficient catalysts in biochemical reactions, that is, they help a chemical reaction take place quickly and efficiently. Studies show that the enzymes present in the enzyme-based coating attracts microbes over the component surface and colonizes on the surface of the plastic forming a biofilm. Therefore, when the enzyme based additives are coated on the surface, the accumulation of microbes is increased and faster in comparison to components/granules with dispersed additives.

Once the microbes have colonized on the component/granules surface they secrete acids and/or enzymes that break down the polymeric chains.

The microbes utilize biodegradable polymeric as the component in unavailability of microbial nutrients.

The formulation of the enzyme based coating may include, but not limited to, natural peptides/enzymes/proteins obtained from edible biological sources such as plant or vegetables etc. The coating formulation may be solvent or water based.

Typical enzyme-based compositions are described in Indian patent Appl. Nos. 3104/mum/2015 and 201611028054, and U.S. Pat. No. 9,925,707/EP3162841, however any other similar/modified composition can also be used without deviating from the scope of the present invention.

According to an embodiment, the present invention describes a process to convert non-biodegradable polymeric raw materials or pellets/granules into biodegradable raw materials/pellets/granules by applying enzyme-based coating, in water or suitable solvent or combination thereof, on their surfaces, before construction of the polymeric components from them.

The coating formulation may be water or solvent based or combination thereof. The enzyme-based coating may be applied using any known method in the art such as, but not limited to, spraying, dipping, wetting, by pressing between wet rollers, fluidized bed, manual or automated mixing in bags or tumbler, Physical, Chemical or Electrostatic vapour deposition etc. Details of the aforesaid coating mythologies, in the art, have not been provided herein for brevity of the present disclosure.

According to another embodiment, the present invention describes a method of coating granules during production of the granules on extrusion palletiser by mixing the enzyme-based composition in the recirculating cooling water in the underwater palletizer or in the strands cooling tank and then cutting the strands to granules.

A periodic dosing of the enzyme-based composition in water/solvent manual or automatic may be required to maintain concentration in a defined range. Suitable sensors may be used to monitor the concentration. Details of the aforesaid coating methodologies, in the art, have not been provided herein for brevity of the present disclosure.

According to still another embodiment, the present invention describes bio-degradable polymeric components, made from non-biodegradable polymeric materials, having enzyme-based coating on their surfaces and a method of coating the enzyme-based composition on the surface(s) of polymeric components to convert them into biodegradable. The enzyme-based composition in water or suitable solvent or combination thereof is applied on the surface of the polymeric components during or after manufacturing them by injection moulding, blow moulding, extrusion, casting or any other manufacturing process.

According to an embodiment, the aforesaid method of applying thin layer of enzyme-based coating on the surface of the polymeric components comprises the steps of providing a moulded polymeric component to a coating station; applying a thin uniform layer of an enzyme based coating on partial or complete surface(s) of the component at the coating station using a suitable coating process; and drying/curing the coating applied on the component online/offline individually or in batches.

The non-biodegradable polymeric component is introduced to the aforesaid process using continuous feeding mechanism, known in the art, to the coating station. The feeding mechanism holds the component to be coated and provides the component to the coating station in line or offline. The coating station(s) apply the enzyme based coating on complete or partial surfaces of the component. Thereafter the coated component is passed through a suitable process to dry/cure the coating applied on the surface of the component online/offline individually or in batches. The coating may also be applied on the surface(s) of the component in-line during the production of component at any suitable location. The coating is cured by drying/curing process that may be a hot air blower and/or radiation source such as but not limited to Electron Beam or UV lamp/LED.

The enzyme-based coating may be applied on all type of polymeric pellets/granules or components made of polymeric materials such as, but not limited to, PE, PP, PET, Nylon, Polystyrene, Polycarbonate etc. The coated products are various polymeric products such as, but not limited to, PET preforms, bottles, furniture, rigid packaging including trays, and boxes, sheets or any other articles made thereof.

The thin layer of enzyme-based coating, applied by the aforesaid method of the present invention, on complete or partial surface of the polymeric granules or pellets induces biodegradation without loss of physical strengths, structural characteristics or aesthetics.

The enzyme-based coating formulations may include a bio marker or any other type of covert marker to incorporate a mechanism to detect/identify/differentiate biodegradable polymeric granules/component from non-biodegradable granules/polymeric component, using suitable means after application.

The present invention requires substantially low quantity of enzyme-based composition compared to that in the prior art as the formulations are only coated on the surface of the granules/component and thus make the process cost effective.

While the present invention has been described in connection with what are currently considered to be the most practical and preferred embodiments, it is to be understood that various arrangements and alternative embodiments are intended to be included within the scope of the appended claims.

I claim:

1. A method of converting non-biodegradable polymeric raw material granules into biodegradable polymeric granules, the method comprising:
   mixing an enzyme-based composition in recirculating cooling water of an underwater pelletizer;
   pelletizing non-biodegradable raw material using the underwater pelletizer such that non-biodegradable polymeric raw material granules produced by the underwater pelletizer are wetted with the recirculating cooling water containing the enzyme- based composition; and
   drying the wetted non-biodegradable polymeric raw material granules to produce an enzyme-based coating on the non-biodegradable polymeric raw material granules, thereby converting the non-biodegradable polymeric raw material granules into biodegradable polymeric granules.

2. The method of claim 1, further comprising monitoring, using a sensor, a concentration of the enzyme-based composition in the recirculating cooling water.

3. The method of claim 1, further comprising periodically dosing the recirculating cooling water with the enzyme-based composition to maintain the concentration of the enzyme-based composition in the recirculating cooling water in a defined range.

* * * * *